(12) United States Patent
Serrano Fernandez et al.

(10) Patent No.: US 7,128,430 B2
(45) Date of Patent: Oct. 31, 2006

(54) ACTUATOR FOR REAR-VIEW MIRRORS

(76) Inventors: Daniel Serrano Fernandez, Pintor Pascual Capuz, 22 bajo E-46018, Valencia (ES); Pedro Serrano Fernandez, Pintor Pascual Capuz, 22 bajo E-46018, Valencia (ES); Daniel Serrano Gil, Pintor Pascual Capuz, 22 bajo E-46018, Valencia (ES)

( * ) Notice: Subject to any disclaimer, the term of this patent is extended or adjusted under 35 U.S.C. 154(b) by 0 days.

(21) Appl. No.: 10/467,863

(22) PCT Filed: Dec. 16, 2002

(86) PCT No.: PCT/ES02/00600

§ 371 (c)(1),
(2), (4) Date: Aug. 13, 2003

(87) PCT Pub. No.: WO03/053741

PCT Pub. Date: Jul. 3, 2003

(65) Prior Publication Data

US 2004/0075922 A1     Apr. 22, 2004

(30) Foreign Application Priority Data

Dec. 20, 2001   (ES) ............................. 200102847

(51) Int. Cl.
*G02B 5/08* (2006.01)

(52) U.S. Cl. .................................. 359/841; 359/877
(58) Field of Classification Search ............... 359/841, 359/843, 877, 881
See application file for complete search history.

(56) References Cited

U.S. PATENT DOCUMENTS

| | | | | |
|---|---|---|---|---|
| 3,480,355 A | * | 11/1969 | Smith | 74/502.1 |
| 3,624,818 A | * | 11/1971 | Stanfield | 359/878 |
| 4,911,545 A | * | 3/1990 | Miller | 359/841 |
| 6,234,637 B1 | * | 5/2001 | Juraschek | 359/871 |
| 6,454,420 B1 | | 9/2002 | Serrano Fernandez et al. | |

FOREIGN PATENT DOCUMENTS

| | | |
|---|---|---|
| DE | 39 26 560 A1 | 2/1991 |
| EP | 0 879 738 A2 | 11/1998 |
| ES | 1 030 446 | 8/1995 |
| JP | 6-87378 | 3/1994 |

* cited by examiner

*Primary Examiner*—Mark A. Robinson
*Assistant Examiner*—Mark Consilvio
(74) *Attorney, Agent, or Firm*—Breiner & Breiner, L.L.C.

(57) ABSTRACT

The improved actuator for rear-view mirrors includes a single pulling mechanism and a locking mechanism. The pulling mechanism includes a linear cylinder and a stop dispose next to a free end of the body of the linear cylinder. The locking mechanism has matching first and second locking elements, where at least one of the locking elements is integral with the pulling mechanism.

2 Claims, 1 Drawing Sheet

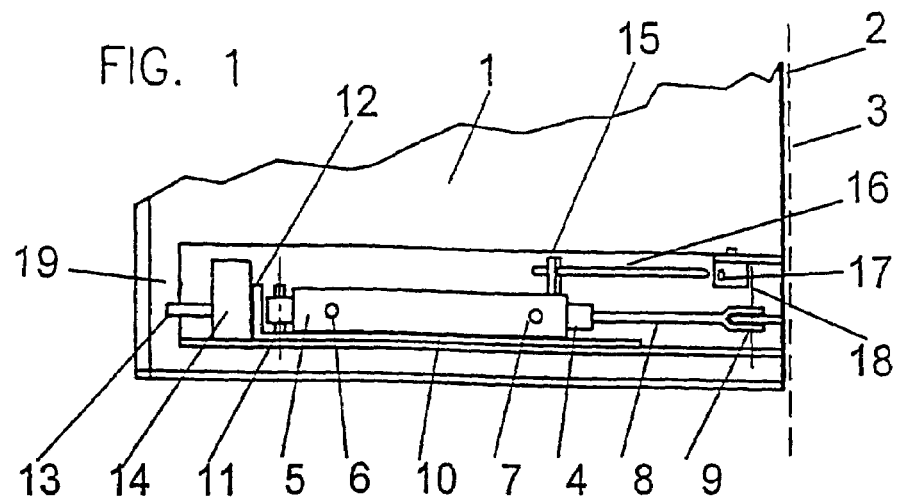
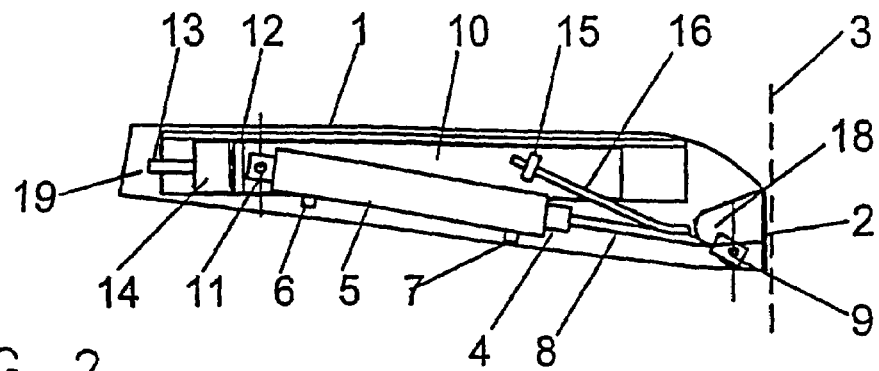
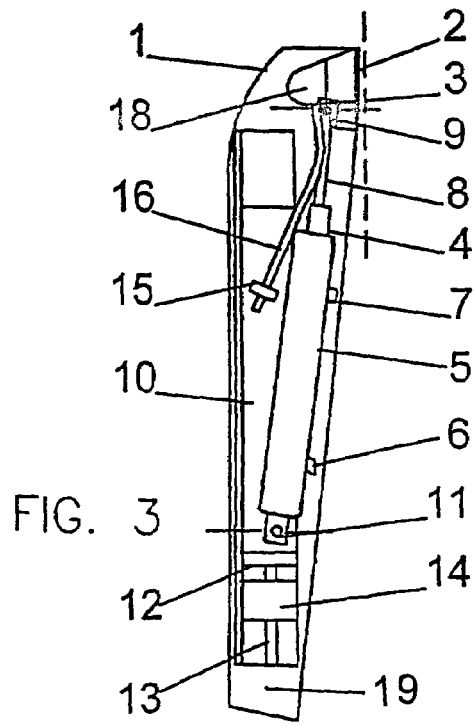

ACTUATOR FOR REAR-VIEW MIRRORS

FIELD OF INVENTION

The invention refers to an improved actuator for rear-view mirrors which uses a pneumatic action linear cylinder as a pulling mechanism to open or close the case carrying the mirror onto the side of the vehicle, to which the case is articulated.

BACKGROUND OF THE INVENTION

The improved actuator for rear-view mirrors is applicable to all types of industry, though it is particularly suited for large vehicles and even more specifically for use on large vehicles formed by the joining of several units, e.g. urban or suburban trams or trains in which it is necessary to watch the movement or access of people around the vehicle. It could also be used on buses, trucks, trolleybuses or other similar vehicles.

These rear view mirrors for large vehicles usually consist of a case which holds the mirror and is articulated at one side to a support which anchors it to the bodywork of the vehicle, while the other side can be folded against the bodywork in the habitual closed position until it is forced away from it by the actuator.

The action of the wind or of other factors may move the rear view mirror from the closed position to the open position at undesired moments. Such would be the case, for example, of the suction produced by the air when moving at speed through a tunnel, or of the rear view mirror being caught in the washing mechanism. For these reasons it seems advisable to be able to lock the case in position on the support.

The current state of technology applied to this type of rear-view mirror can be seen in Model ES U9500741, by the same applicants, which describes a movable rear-view mirror for large vehicles which can be turned automatically to place it parallel or perpendicular to the side of the vehicle, coinciding with the mirror's positions of closed or opened respectively, and which is made up of a case which holds the mirror, solidly articulated to a support fixed to the corresponding side of the vehicle. Furthermore the rear-view mirror has a rotating device fixed to the support, the axis of which is situated in the direction of the rotation axis of the case, which when actuated automatically causes the rear-view mirror to turn, opening or unfolding from the side of the vehicle; the device is turned in the opposite direction for the rear-view mirror to be once more folded against the side, the position normally adopted when the vehicle is in motion. It also has a fixing mechanism which ensures the said folded position of the mirror with respect to the support and the side of the vehicle to which it is attached. The system designed in this way is expensive to manufacture and the turning device used even more so.

The same applicants perfect and simplify the rear-view mirrors of the type described and make them more economical with the use of a linear pneumatic cylinder, of single or double action, and therefore submit for registration, with number U9902742, a rear-view mirror which includes a case which holds the mirror, and which is articulated to the support which can be fixed to the corresponding side of the vehicle, the case and the support being connected by a pneumatic cylinder, the action of which automatically causes the case to turn on its support, from a closed or folded position against the same to an unfolded position, which coincides with open, or vice versa, and the essential characteristic of which lies in the fact that one end of the pneumatic cylinder is anchored in an articulated manner to the case, while the free end of the piston is articulated to a projection on the support. The piston of the pneumatic cylinder has a prolongation directed towards the projection of the support upon which it is articulated. This arrangement achieves the swift and simple folding or unfolding of the rear view mirror although the locking mechanism continues to be pulled by means of an additional pneumatic cylinder.

At this stage of the technique it seems necessary to have a second pulling mechanism to force the locking mechanism, normally acting on a first locking element provided on the case carrying the mirror and part of the said locking mechanism against a second locking mechanism of said locking mechanism that is fixed to the support of the case, or vice versa. However, it is evident that this is expensive, as well as complex, because to the cost of a second cylinder must be added that of its valves, flow regulators or other elements necessary for its use.

SUMMARY OF THE INVENTION

This type of rear view mirror is now perfected by means of an actuator of the locking mechanism, conceived cheaply and simply as a pulling mechanism, consisting of a linear pneumatic cylinder and a stop, which holds the rear view mirror in the desired position until an order from the driver of, the vehicle modifies it. The arrangement is also intended to absorb the force of an impact on the mirror case allowing it to fold against the wall of the vehicle and then immediately unfold from it.

Thus, according to the invention, the rear view mirror consists of a mirror carried by a case which is joined in an articulated manner to a support which can be fixed to a side of the vehicle, the case and the support being linked by a pneumatic cylinder whose action automatically causes the case to turn relative to the support from a closed position folded against it to an unfolded position coinciding with an open position, or vice versa.

An essential characteristic of the improved actuator for rear view mirror that connects the case of a rear view mirror with the support holding it against the wall of the vehicle to enable the case to turn against the said support when opening or closing, is that the actuator combines a single pulling mechanism acting on the mirror case of the rear view mirror and a locking mechanism that can be actuated by this single pulling mechanism.

Another characteristic is that the said pulling mechanism of the actuator consists of a single linear cylinder and of a stop placed near the free end of the body of the said linear cylinder, which limits its run and which constitutes the means of pushing the case of the rear view mirror into the open position.

A further characteristic of the invention is the fact that the said linear cylinder articulates its body to a support, or supplement, which prolongs it backwards by means of a telescopic appendage which can slide and be regulated in a guide provided in said stop fixed to the case.

Yet another characteristic of the invention is the fact that the locking mechanism is formed of a first and a second locking element, configured in mutual correspondence, and at least one of them forming an integral part of the pulling mechanism.

The actuator consists, in a preferred realisation of the invention, of a pulling mechanism and a locking mechanism, the pulling mechanism being composed of a linear pneumatic cylinder and a stop interposed on the run of the said cylinder, and at least one of the two locking elements being integrated with the pulling mechanism, so that, the cylinder being anchored by the free end of its piston to the support of the rear view mirror case, it permits the forward and backward movement of the body of the cylinder, and on the backward movement it is forced against the stop on the case, constituting a rigid arm that pushes the case and separates it from its support, and on the forward movement it causes the pulling of one of the two elements forming the locking mechanism towards the other to ensure that the case is held against its support.

In the realisation example proposed by the invention, one of the two locking elements forming the locking mechanism—the first locking element—is configured as a rigid locking rod which it is suggested should form part of a supplement fixed to the free end of the cylinder body, while the other locking element—the second locking element—is a cavity or lodging provided in the support of the case and shaped to retain the end of the rod. It is clear that this supplement can be replaced, though at a higher cost, by incorporating it in the cylinder at source. This rigid locking rod can be applied not only on a support or supplement that moves together with the said cylinder, but also to the end of the cylinder of which it could also form a part. In order to provide greater strength to the locking system, this rigid locking rod has been arranged on the support appreciably close to the piston of the cylinder.

With the aim of adequately guiding the rigid locking rod until its end lodges in the retention cavity that constitutes the second locking element, the body of the pneumatic cylinder articulates its end to the support or supplement carrying the said rod, which is prolonged as a telescopic appendage that can slide through a guide provided in the stop fixed on the case, the distance of the slide being regulated by means of an elastically assisted holding device, for example a spring-assisted ball that fits into cavities provided on the appendage. It is evident that this same arrangement can be used to absorb the force of an impact received on the case; the impact would overcome the force of the spring pushing the ball, which would be forced out of the retaining cavity permitting the guided movement of the stop joined to the case on the appendage and the gradual folding of the case until its stop makes contact with the stop wall provided on the supplement. It is also evident that another arrangement of the support of the rod would serve the same purpose.

In the example proposed and to prevent undesired contacts or frictions in the approach of the end of the locking rod that defines the first locking element to the lodging or retention cavity that constitutes the second locking element, the said guide in the case carrying the mirror could incorporate a retainer to hold briefly the appendage thus permitting the precise directioning of the locking rod to the entrance of the locking cavity.

For better understanding of what has been described up to now, we are enclosing with this descriptive report a set of drawings in which the preferred realisation of the object of the invention is shown, but the exercise of this choice should not be interpreted as, induce to, or serve as a basis for, implying a limitation of the graphic representation nor, of course, of the particular characteristics of this application.

Thus, the improved actuator for rear view mirrors suggested by the example is portrayed suitably fitted to a rear view mirror supported on the wall of a vehicle. The representation is offered in simplified form, with no elements of the pneumatic system other than the linear pneumatic cylinder itself and its respective air inlets and outlets. The representation of the side of the vehicle has been schematised, indicating it with broken lines in the diagrams.

DESCRIPTION OF THE DRAWINGS

FIG. 1 shows, in elevation, the lower part of the rear-view mirror, including the improved actuator according to the invention, limited by an auxiliary break line. In the diagram, the case carrying the mirror is in the open position, unfolded from its support, and the actuator is shown in a position of final approach to, or initial separation from, the free end of the body of the linear cylinder relative to the stop interposed close to it and provided fixed to the case and in which the first locking element faces the second, though separate from it.

FIG. 2 shows, seen from above, the portion of the rear view mirror assembly illustrated in FIG. 1, in which we observe the case unfolded from the support as well as the positioning of the linear cylinder and stop that form the pulling mechanism and the separation between the first and second elements of the locking mechanism.

FIG. 3, also from above, shows the part of the rear view mirror assembly shown in FIG. 1, but now in the position corresponding to the locking of the case which is observed folded against the support and parallel to the side of the vehicle, shown with a broken line. It is also easy to see in the diagram the separation between the free end of the cylinder body from the stop fixed to the case, and the meeting of the first locking element with the second locking element.

DETAILED DESCRIPTION OF THE INVENTION

In the figures we observe that the case holding the rear view mirror (1) is joined, in an articulated manner, to the support (2) which fixes it to the wall of the vehicle (3), and it is easy to see between the case (1) and the support (2) a linear cylinder (4), which links them.

The linear cylinder (4) is made up of a cylindrical body (5) with air inlets (6, 7) and a piston (8). In the example, the cylinder (4) shows the free end of its piston (8) articulated to the support of the case (2) at (9) while the opposite end of its case (5) is presented articulated at (11) to the support or supplement (10).

The support (10) is portrayed, in the example proposed, with a stop wall (12) from which emerges frontally a prolongation or appendage (13) which we see introduced into the guide hole (not shown) of a stop (14) which, with the cylinder (4) constitutes the pulling mechanism. It can also be seen that the support (10) includes a supporting wall (15) from which emerges frontally the locking rod (16) which constitutes the first locking element and whose free end is shown facing the cavity (17) which is the second locking element, provided in a stay (18) on the support (2). Both dispositions can be regulated to ensure better meeting or fit between the two elements of the locking mechanism (16 and 17). The arrangement of a retainer for the appendage (13) is indicated by (19).

From all the above and with the help of the figures it is easy to deduce the operation of the improved actuator for rear view mirror proposed by the invention. Starting from the locked position coinciding with that shown in FIG. 3, air injected into (6) initially causes a slight backward movement of the body (5) of the cylinder (4) pulling the supplement (10) with the separation of the end of the locking rod (16) from the locking cavity (17). The backward movement continues until the wall (12) comes into contact with the stop (14) guided by the appendage (13); the pulling mechanism then pushes the case (1) of the rear view mirror permitting it to unfold away from its support (2) to the open position shown in FIGS. 1 and 2.

It is evident that in the open position shown in FIGS. 1 and 2, an initial injection of air into (7) causes a forward movement of the body (5) of the cylinder (4) over the piston (8) to enable the case (1) to approach the support (2), the folding culminating with a final burst of air which continues the pulling of the supplement (10) separating it from the wall (12) of the stop (14), and the end of the locking rod (16) penetrates into the locking cavity (17) thus locking the rear view mirror, the position shown in FIG. 3.

It is also evident that an impact received by the case (13) would cause it to approach the wall of the vehicle (3) following the forward movement of its stop (14) against the appendage (13) and until it meets the wall (12) of the supplement (10); the degree of approach will depend on the impact absorption distance initially regulated between the wall (12) and the stop (14) with the help of the effect of the retainer (19) on the appendage (13).

The invention claimed is:

1. A rear view mirror actuator comprising a single pulling mechanism and a locking mechanism which is actuated by the single pulling mechanism, wherein the single pulling mechanism comprises a linear cylinder and a stop positioned at a free end of a body of the linear cylinder, wherein the actuator connects a case holding a mirror to a support and said actuator provides for opening or closing said case against the support, wherein upon the opening, the body of the linear cylinder provides an initial backward movement until the stop contacts a stop wall operatively positioned between the stop and the linear cylinder, and wherein said stop limits movement of the linear cylinder and serves as means of pushing open the case from the support.

2. A rear view mirror actuator according to claim 1, wherein the body of the linear cylinder is articulated with respect to an appendage that slides and serves as a guide as to the stop.

* * * * *